Patented Sept. 14, 1948

2,449,051

UNITED STATES PATENT OFFICE 2,449,051

LIQUID PHASE REFINING OF PETROLEUM HYDROCARBON PRODUCTS

Ferdinand W. Breth and Anthony Kinsel, Petrolia, Pa., assignors to L. Sonneborn Sons, Inc., a corporation of Delaware No Drawing. Application March 8, 1946, Serial No. 653,128

13 Claims. (Cl. 196—147)

This invention relates to new and useful improvements in the liquid phase refining of petroleum hydrocarbon products.

In conventional petroleum hydrocarbon refining, the products are charged in liquid condition onto filters of a suitable petroleum refining adsorbent and are permitted to percolate therethrough. If the petroleum hydrocarbons are normally liquid, as, for example, overhead distillates or residual stocks, they are filtered as such or in solution in volatile hydrocarbon solvents. If the same, however, are normally solid, as, for example, waxes, paraffin or petrolatum, they are charged onto the filter for percolation in substantially molten condition. A variety of filter materials are conventionally used as petroleum refining adsorbents, such as activated carbon, bone black, fuller's earth, bauxite, magnesite, silica and silica gels, and alumina. These petroleum refining adsorbents are usually substantially granular materials of about 10 to 100 and preferably 30 to 60 mesh. Some of them are specially treated or activated, as is well understood in the art, to increase their refining efficiency. The filtrate emerging from the bottom of the column of adsorbent material is usually segregated into fractions of step-wise graduated purity. The fraction first emerging from the filter is the most highly refined or purified while succeeding fractions possess progressively decreasing degrees of purity commensurate with the gradual exhaustion of the adsorbent. The efficiency of the refining procedure is measured by the total yield of improved or refined product from a given quantity of raw stock or by the yield of a given fraction of the refined product defined by predetermined grades or tests of purity as to color, odor, haze, cast, fluorescence, or relative freedom from impurities such as sulfur or carbon residue yielding substances.

One object of our invention comprises inter alia an improved method for materially increasing the yields of desired fractions refined petroleum hydrocarbons of predetermined grade or degree of purity from a given raw stock.

This and other objects of the invention will be apparent from the following description.

The improvement in petroleum hydrocarbon refining in accordance with the invention essentially comprises subjecting a petroleum hydrocarbon refining adsorbent to vibrations for a period sufficient to obtain an over-all volume reduction of said adsorbent of at least 5% and thereafter filtering a petroleum hydrocarbon in liquid phase through the said adsorbent thus vibrated.

In the practical application of our invention, a suitable granular adsorbent, preferably of about 30 to 60 mesh, as it is normally used for petroleum hydrocarbon percolation refining, such as activated carbon, bone black, fuller's earth, bauxite and preferably activated bauxite, magnesite, silica or silica gel, alumina and preferably activated alumina, is subjected while substantially dry (i. e., substantially unwetted by petroleum hydrocarbon) to prolonged vibrations for a period sufficient to reduce the volume of the adsorbent by approximately at least 2% and preferably approximately at least 10 to 15%, whereupon the petroleum hydrocarbon is percolated through the thusly vibrated adsorbent in substantially liquid condition. Depending upon the material used, optimum volume reduction through vibration may be as high as 40% or higher.

The petroleum hydrocarbon adsorbent may be subjected in accordance with the invention to prolonged vibration in any convenient manner, and preferably by the use of a suitable vibrating mechanism. The rate of vibration may be varied throughout a relatively wide range. A suitable vibrating device may be one actuated by an appropriate mechanism, such as an electrical, hydraulic, or pneumatic mechanism, in which vibrations of for instance an order of magnitude of about 2000 to 5000 vibrations per minute are produced by the use of appropriate means, as is well understood in the art of vibrating devices. Vibrations should be continuous for at least several minutes at a time. For best results, it is of advantage to continue the vibrations to which petroleum refining adsorbent is subjected for a period sufficient to produce an over-all reduction of volume of the filter material of approximately at least 2% and preferably at least 10 to 15%. As a rule no material increase in the effectiveness of the vibrated filter material is obtained by continuing the vibrations beyond the point of optimum volume reduction. Volume reduction in accordance with the invention serves as an outward measure coinciding with optimum efficiency imparted to the filter material by the vibrations.

The filter material may be vibrated until the desired volume reduction is obtained prior to the delivery of hydrocarbon material to the filter top. Alternatively vibration may be commenced or continued simultaneously with the delivery of hydrocarbon material to the filter top.

A suitable vibrator useful in accordance with the invention may be for instance one of the electrically, solenoid actuated types. The vibrator or vibrating unit thereof is preferably attached to the outside of a filter unit or column, and when set in motion transmits vibrations through the walls of the filter unit or column to the petroleum hydrocarbon adsorbent contained therein. Alternatively, the vibrator may be so utilized as to transmit its vibrations to metal rods or members suspended within the filter. After the desired volume reduction of filter material and preferably a volume reduction approaching optimum reduction is obtained, the vibrator is turned off and the petroleum hydrocarbon is pumped in liquid condition onto the top of the filter and permitted to percolate through. Optimum volume reduction is considered obtained when upon continued vibration for a period of approximately fifteen minutes no further appreciable reduction in volume is observed. When using a normally solid petroleum hydrocarbon of the wax, petrolatum or paraffin type, the same is first converted into the liquid phase by melting and is then pumped onto the filter column in molten condition. In many cases improved results are achieved by the use of several or multiple vibrators on a single filter column.

The following examples and tables are furnished by way of illustration but not of limitation:

EXAMPLE I

A standard filter column of about 15 feet high having a capacity of about five tons of filter material was charged to capacity with activated bauxite of 30 to 60 mesh. A raw lubricating oil stock having a Saybolt viscosity of 64 (seconds at 210° F.), a Lovibond color of 15R ($\frac{1}{16}$ inch cell) and a carbon test of 1.1% was pumped onto the filter and permitted to percolate through. The total yield of the refined fraction of predetermined Lovibond color of 4R ($\frac{1}{16}$ inch cell) was 1482 gallons per ton having a carbon test of 0.7%.

EXAMPLE II

A 15 foot five-ton capacity filter column as described in Example I and charged to capacity with activated bauxite was used. The filter was closed and the column subjected to vibrations for one hour by means of three circumferentially disposed electric vibrators operating at an average frequency of 3600 vibrations per minute and having a normal capacity of being operated at a range of from 2400 to 4800 vibrations per minute. At the end of this vibration period about 10% reduction in volume of the bauxite had taken place and continued vibrations for about another 15 minutes did not produce appreciable further decrease in volume. The same stock as used in Example I was then percolated through the vibrated filter material, percolating being discontinued with the exhaustion of the filter material as evidenced by absence of improvement of the color of the filtrate compared to that of the raw stock used. The total yield of refined fraction of predetermined purity of a Lovibond color of 4R ($\frac{1}{16}$ inch cell) was 2394 gallons per ton having a carbon test of 0.7%.

EXAMPLE III

A five-ton capacity filter column of 15' height was charged with fuller's earth of 30 to 60 mesh and the same lubricating oil raw stock specified in Example I was percolated through the filter. Total yield of refined fraction of predetermined purity of a Lovibond color of 4R ($\frac{1}{16}$ inch cell) and a carbon test of 0.8% was 1200 gallons per ton.

EXAMPLE IV

The same filter material using an identical filter column as described in Example III was used. The filter charged with the adsorbent to capacity was closed and subjected to vibration in the manner set forth in Example II. Optimum reduction in over-all volume of about 10% filter material was obtained after approximately one-half hour, using the same vibrator arrangement as described in connection with Example II. The same stock as used in Example III was then percolated through the vibrated fuller's earth in the manner set forth in Example III. Total yield of refined fraction of predetermined purity of a Lovibond color of 4R ($\frac{1}{16}$ inch cell) was 1870 gallons per ton, showing a carbon test of 0.8%.

EXAMPLE V

A microcrystalline wax of the following characteristics was used:

ASTM, M. P., 140–150° F.
ASTM, penetration—30–40 pen. at 77° F. (needle)

This wax was percolated in molten condition through a 15 foot five-ton filter column filled to capacity with 30 to 60 mesh fuller's earth in the manner described in Example I. Total yield of refined fraction haze-free and white in color was 670 gallons per ton.

EXAMPLE VI

Using the same filter and filter material as set forth in connection with Example V, the filter material was subjected to vibration using the same vibrating means and conditions set forth in Example II. Vibration was continued until about 10% reduction in volume was obtained, which was accomplished after approximately one-half hour. The same stock used in Example V was then percolated through the vibrated filter material in the manner set forth in Example II. Total yield of refined fraction haze-free and white in color was 1350 gallons per ton.

EXAMPLE VII

Example V was repeated except an activated bauxite was used as the adsorbent in lieu of fuller's earth therein set forth. All other conditions as to stock, type and capacity of filter and procedure were identical with those set forth in Example V. Total yield of refined fraction haze-free and white in color was 700 gallons per ton.

EXAMPLE VIII

Using the same filter and filter material as set forth in Example VII the filter material was subjected to vibration as set forth in connection with Example II until about 10% reduction in volume was obtained, which was accomplished after approximately one hour. The same stock used in Example VII was then percolated through the vibrated filter in the manner set forth in Example II. Total yield of refined fraction haze-free and white in color was 2150 gallons per ton.

EXAMPLE IX

A crude petrolatum of the following characteristics was used:

ASTM, M. P., 125°–127° F.
ASTM, Consistency, 180

The petrolatum was percolated in molten condition through a fifteen-foot, five-ton filter column filled to capacity with 30 to 60 mesh fuller's earth in the manner described in Example I. Total yield of refined fraction of predetermined purity of a Lovibond 2 Yellow (2 inch cell) was 312 gallons per ton.

EXAMPLE X

Using the same filter and filter material as set forth in connection with Example IX, the filter material was subjected to vibration, using the same vibrating means and conditions set forth in Example II. Vibration was continued until about 10% reduction in volume was obtained, which was accomplished after approximately 1 hour. The same stock used in Example IX was then percolated through the vibrated filter material in the manner set forth in Example II. Total yield of refined fraction of predetermined purity of 2 Yellow Lovibond (2 inch cell) was 718 gallons per ton.

about 10% reduction in volume was obtained, which was accomplished after approximately 1 hour. The same stock used in Example XIII was then percolated through the vibrated filter material in the manner set forth in Example II. Total yield of white sulfur-free doctor negative product was 4040 gallons per ton.

Using instead of the bauxite or fuller's earth specified in any of the foregoing examples any other conventional petroleum refining absorbent of the preferred mesh size, i. e., between 30 and 60 mesh, such as silica or silica gel, magnesite, clay, alumina, activated alumina or any other well known and conventionally used petroleum hydrocarbon adsorbent, improvements of gallon yield for the predetermined color ranges similar to those set forth in connection with the herein specified examples, are obtained.

The pertinent data and various results obtained as described in the above examples are set forth in the following table:

Table

| Raw Stock | Filter Material | Yields in Gals. | | Gain in Efficiency | Tests | |
|---|---|---|---|---|---|---|
| | | Conventional | Vibrated | | Lov. Color | Other |
| | | | | Percent | | |
| Lube Oil: Saybolt Visc. 210–64; Lovibond Color 15R 1/16" cell Carbon test 1.1%. | Fuller's earth | 1,200 | 1,870 | 56 | 4R 1/16" cell | 0.8% carbon. |
| | Bauxite | 1,482 | 2,394 | 62 | ..do.. | 0.7% carbon. |
| Microcrystalline Wax | Fuller's earth | 670 | 1,350 | 102 | White | Haze free. |
| | Bauxite | 700 | 2,150 | 307 | ..do.. | Do. |
| Crude Petrolatum | Fuller's earth | 312 | 718 | 130 | 2Y 2" cell | |
| | Bauxite | 340 | 850 | 150 | ..do.. | |
| Raw Kerosene | Bauxite | 2,170 | 4,040 | 88 | White | Sulfur negative copper dish test |

EXAMPLE XI

The same petrolatum specified in connection with Examples IX and X was percolated through a 30 foot two-ton filter column filled to capacity with 30 to 60 mesh activated bauxite in the manner described in Example I. Total yield of refined fraction of predetermined purity of 2 Yellow Lovibond (2 inch cell) was 340 gallons per ton.

EXAMPLE XII

Using the same filter and filter material as set forth in the preceding example, the filter material was subjected to vibration, using the same vibrating means and conditions set forth in Example II. Vibration was continued until about 10% reduction in volume was obtained, which was accomplished after approximately 1 hour. The same stock used in previous example was then percolated through the vibrated filter material in the manner set forth in Example II. Total yield of refined fraction of predetermined purity of 2 Yellow Lovibond (2 inch cell) was 850 gallons per ton.

EXAMPLE XIII

A raw kerosene (sulfur copper dish test black) was percolated through a 15 foot five-ton filter column filled to capacity with 30 to 60 mesh activated bauxite in the manner described in Example I. Total yield of refined fraction of a white, sulfur-free doctor negative product was 2,170 gallons per ton.

EXAMPLE XIV

Using the same filter and filter material as set forth in connection with Example XIII, the filter material was subjected to vibration, using the same vibrating means and conditions set forth in Example II. Vibration was continued until As will be seen from the foregoing table, the gain in efficiency between the unvibrated conventional and the vibrated filter material is striking, ranging from 56% to as high as 307% improvement in gallon yield of a refined product of given predetermined grade.

The foregoing description is for purposes of illustration and not of limitation, and it is, therefore, our intention that the invention be limited only by the appended claims or their equivalents wherein we have endeavored to claim broadly all inherent novelty.

We claim:

1. In the method of refining petroleum hydrocarbons, the improvement which comprises subjecting a mass of particled petroleum hydrocarbon refining mineral adsorbent to vibration for a period sufficient to obtain an over-all volume reduction of said mass of adsorbent of at least approximately 5% and thereafter filtering a petroleum hydrocarbon in liquid phase through the said volume reduced adsorbent thus vibrated.

2. The improvement in accordance with claim 1 in which said petroleum hydrocarbon adsorbent is vibrated until it exhibits approximately at least 10% to 15% reduction in volume.

3. The improvement in accordance with claim 1 in which said petroleum hydrocarbon adsorbent is vibrated until it exhibits optimum reduction in volume.

4. In the method of refining petroleum hydrocarbons, the improvement which comprises subjecting a mass of particled petroleum hydrocarbon refining mineral adsorbent to vibrations at an order of magnitude of approximately from 2000 to 5000 vibrations per minute for a period sufficient to impart to said mass of adsorbent at least approximately 5% reduction in volume and thereafter filtering a petroleum hydrocarbon in liquid phase through said volume reduced adsorbent thus vibrated.

5. The improvement in accordance with claim 4 in which said petroleum hydrocarbon adsorbent is vibrated until it exhibits approximately at least 10% to 15% reduction in volume.

6. The improvement in accordance with claim 4 in which said petroleum hydrocarbon adsorbent is vibrated until it exhibits optimum reduction in volume.

7. In the method of refining petroleum hydrocarbons, the improvement which comprises subjecting a mass of particled petroleum hydrocarbon refining mineral adsorbent to vibration for a period sufficient to obtain an over-all volume reduction of said mass of adsorbent of at least approximately 5% and thereafter filtering a normally liquid petroleum hydrocarbon through the said volume reduced adsorbent thus vibrated.

8. The improvement in accordance with claim 7 in which said adsorbent is vibrated until it exhibits optimum reduction in volume.

9. In the method of refining petroleum hydrocarbons the improvement which comprises subjecting a mass of particled petroleum hydrocarbon refining mineral adsorbent to vibration for a period sufficient to obtain an over-all volume reduction of said mass of adsorbent of at least approximately 5% and thereafter filtering a normally solid petroleum hydrocarbon in molten condition through the said volume reduced adsorbent thus vibrated.

10. The improvement in accordance with claim 9 in which said petroleum hydrocarbon adsorbent is vibrated until it exhibits approximately at least 10% to 15% reduction in volume.

11. In the method of refining petroleum hydrocarbons the improvement which comprises subjecting a mass of particled petroleum hydrocarbon refining mineral adsorbent to vibration for a period sufficient to obtain an over-all volume reduction of said mass of adsorbent of at least 2% and thereafter filtering molten petrolatum through the said volume reduced adsorbent thus vibrated.

12. The improvement in accordance with claim 11 in which said adsorbent is vibrated until it exhibits approximately 10% to 15% reduction in volume.

13. The improvement in accordance with claim 11 in which said adsorbent is activated bauxite vibrated until it exhibits optimum reduction in volume.

FERDINAND W. BRETH.
ANTHONY KINSEL.

REFERENCES CITED

The following references are of record in the file of this patent:

UNITED STATES PATENTS

| Number | Name | Date |
| --- | --- | --- |
| 2,160,874 | Kinsel | June 6, 1939 |
| 2,206,337 | Steele | July 2, 1940 |
| 2,387,171 | Morgan | Oct. 16, 1945 |
| 2,390,917 | Breth et al. | Dec. 11, 1945 |
| 2,392,915 | Grosse et al. | Jan. 15, 1946 |
| 2,413,072 | Brown | Feb. 4, 1947 |